L. L. WINTERS.
OIL GAGE.
APPLICATION FILED OCT. 22, 1920.
1,390,415.
Patented Sept. 13, 1921.
Fig. 1.
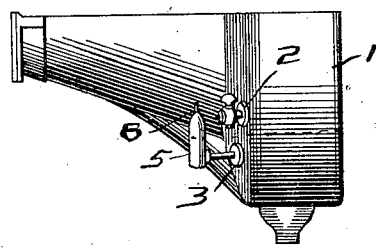
Fig. 2.
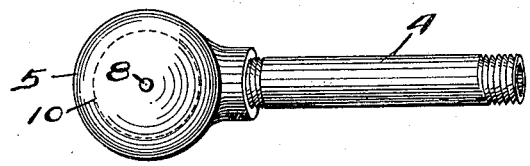
Fig. 3.
Fig. 4.
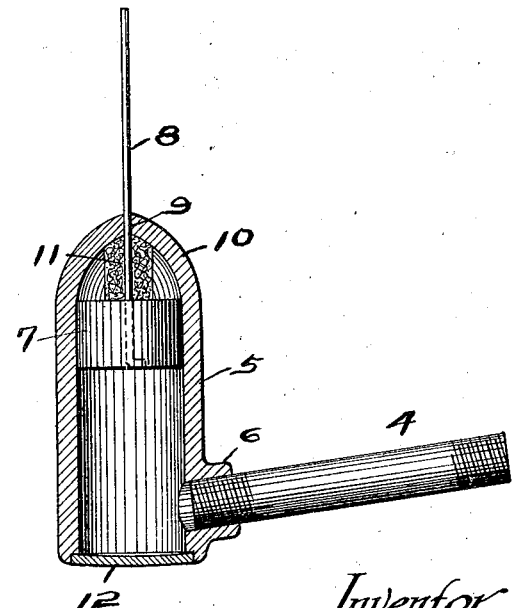
Inventor
Lee L. Winters
by
Owen, Owen & Crampton

UNITED STATES PATENT OFFICE.

LEE L. WINTERS, OF ANN ARBOR, MICHIGAN.

OIL-GAGE.

1,390,415. Specification of Letters Patent. Patented Sept. 13, 1921.

Application filed October 22, 1920. Serial No. 418,654.

*To all whom it may concern:*

Be it known that I, LEE L. WINTERS, a citizen of the United States, and a resident of Ann Arbor, in the county of Washtenaw and State of Michigan, have made an Invention Appertaining to Oil-Gages; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
My invention has for its object to provide an oil gage that is particularly adapted for indicating the amount of oil in the crank shaft casing of an engine, which will accurately and clearly indicate the amount of oil in the shell or casing and yet which is so constructed that the oil cannot escape from the indicator. It also has for its object to provide in an exposed gage or indicator the means whereby dirt or mud will be discharged and indicating means will not be clogged or hampered by dirt and mud that may be thrown upon the gage.

The invention has for its object other features and advantages which will appear from the following description and upon examination of the drawings.

The invention may be contained in structures of different forms and be used for indicating levels of liquids of different kinds.
To illustrate a practical application of the invention I have selected a structure containing the invention and shall describe it hereinafter. The structure selected is illustrated in the accompanying drawings.

Figure 1 of the drawings illustrates a part of a crank shaft casing of a Ford automobile and the gage embodying my invention attached thereto. Fig. 2 is a top view of the gage. Fig. 3 is a sectional view, and Fig. 4 illustrates the float and rod which is operated by the oil.

In the drawings, 1 is a crank shaft casing of a Ford engine, which, as is well known, is provided with a pair of bosses 2 and 3 located on the rear side of an enlarged portion of the casing in which are commonly inserted pet cocks by means of which the level of the oil within the shell may, under certain conditions, be approximately estimated by opening one or both of the pet cocks. The flow or the rate of flow from one or both of the pet cocks will indicate to an experienced driver of a Ford machine the approximate location of the oil.

The construction containing my invention is inserted in the lower boss 3 in the place of the pet cock commonly located at that point, as shown in Fig. 1.

The structure containing my invention is provided with a short connecting pipe 4 to which a shell 5 is secured. The pipe 4 connects the interior of the shell 5 with the interior of the crank shaft casing 1. The pipe is secured in the boss 6 formed at the lower end of the shell 5. The oil passes from the crank shaft casing 1 through the pipe 4 and into the shell 5 and fills the shell 5 to the same level at which it exists in the crank shaft casing. A float 7 preferably formed of coated cork is located in the shell 5. The cork 7 floats on the surface of the oil and consequently raises and lowers in the shell 5 as the level in the crank shaft casing 1 changes. A rod 8 which may be coated with a red paint, if desired, extends through an opening 9 located in the top of the shell and is secured in the cork 7. The position of the rod 8 relative to the top of the shell 5 will indicate the level of the oil in the shell 5 and consequently in the crank shaft casing 1.

Inasmuch as the shell 5 is on the outside of the car and consequently in an exposed position, mud and water will splash upon the shell 5 and also dust and dirt will collect thereon. This would ordinarily tend to clog and retard or prevent the movements of the rod 8 through the opening 9. In order to prevent the retention of any particles near the opening 9 that might clog the rod 8, the top 10 of the shell 5 is made dome-shaped, which will cause the mud and dirt to be thrown from the top of the shell 5.

In connection with a number of engines, and particularly in connection with the Ford engine, the oil located in the crank shaft casing is churned to such an extent that it gives the same appearance as though it were boiling, which causes it to fall and rise to an apparent level much greater than the oil would be if it were in a quiescent state. The oil when it is churned by the rapidly rotating crank shaft will enter the shell 5 and raise the float to the top of the shell 5 and under many conditions will force its way out through the opening 9. In order to prevent the escape of the oil from the shell 5

I have provided a block of solid felt 11 that has a depth sufficient to extend from the under side of the central part of the dome-shaped top of the shell 5 to the float 7 when the float is up. The rod 8 passes up through the center of the felt block 11 and thus the felt block 11 is pressed against the under side of the dome-shaped top 10 and thus the opening 9 is sealed and escape of the oil is prevented.

The lower end of the shell 5 may be closed by any suitable means, but I have found it preferable to close the lower end of the shell 5 after the float 11 and the parts attached thereto, or connected therewith, are inserted in the shell 5, by means of the expansible washer 12.

I claim:—

In an oil gage for a crank shaft casing, a dome-shaped shell, a float located in the shell, a rod connected to the float and extending through the top of the shell, and a block of felt located on the float and around the rod for seating within the dome and around the opening through which the rod extends.

In testimony whereof I have hereunto signed my name to this specification.

LEE L. WINTERS.